(12) United States Patent
Maalouf et al.

(10) Patent No.: US 10,628,925 B2
(45) Date of Patent: Apr. 21, 2020

(54) METHOD FOR DETERMINING A POINT SPREAD FUNCTION OF AN IMAGING SYSTEM

(71) Applicant: IDEMIA IDENTITY & SECURITY FRANCE, Issy les Moulineaux (FR)

(72) Inventors: Aldo Maalouf, Issy les Moulineaux (FR); Mokrane Malek, Issy les Moulineaux (FR)

(73) Assignee: IDEMIA IDENTITY & SECURITY FRANCE, Issy les Moulineaux (FR)

( * ) Notice: Subject to any disclaimer, the term of this patent is extended or adjusted under 35 U.S.C. 154(b) by 0 days.

(21) Appl. No.: 16/134,409

(22) Filed: Sep. 18, 2018

(65) Prior Publication Data
US 2019/0087943 A1 Mar. 21, 2019

(30) Foreign Application Priority Data
Sep. 20, 2017 (FR) ...................................... 17 58701

(51) Int. Cl.
*G06T 5/00* (2006.01)
*G06T 5/10* (2006.01)

(52) U.S. Cl.
CPC ................ *G06T 5/003* (2013.01); *G06T 5/10* (2013.01)

(58) Field of Classification Search
CPC .................................. G06T 5/003; G06T 5/10
USPC ......................................................... 382/255
See application file for complete search history.

(56) References Cited

U.S. PATENT DOCUMENTS

| 2013/0038749 A1* | 2/2013 | Hatakeyama | ........... G06T 5/003 348/222.1 |
| 2013/0215296 A1* | 8/2013 | Oniki | ...................... G06T 5/008 348/241 |
| 2014/0139705 A1* | 5/2014 | Ebe | ........................ H04N 5/217 348/234 |

(Continued)

FOREIGN PATENT DOCUMENTS

WO     2012/101995 A1     8/2012

OTHER PUBLICATIONS https://www.iso.org/obp/ui#iso:std:iso:12233:ed-2:v1:en; Online Browsing Platform; ISO 12233:2014(en); "Photography—Electronic still picture imaging—Resolution and spatial frequency responses"; Retrieved Nov. 28, 2018.

(Continued)

*Primary Examiner* — Juan A Torres
(74) *Attorney, Agent, or Firm* — Oliff PLC; R. Brian Drozd

(57) ABSTRACT

A method for determining a point spread function of an imaging system. The method includes: for each position in a plurality of positions of a target in an optical field of the imaging system: acquiring an image of the target, referred to as the real image; obtaining a synthetic image of the target representing a digital model of the target adjusted to a zone of the real image corresponding to the target so that the model coincides with the zone; estimating the point spread function using the real image and the synthetic image; and calculating an optical transfer function by applying a Fourier transform to the point spread function; calculating an average optical transfer function from the optical transfer functions calculated for each position in the plurality of posi- (Continued)

tions; and obtaining an average point spread function by applying an inverse Fourier transform to the average optical transfer function.

11 Claims, 3 Drawing Sheets

(56) References Cited

U.S. PATENT DOCUMENTS

| | | | |
|---|---|---|---|
| 2014/0218557 A1* | 8/2014 | Ebe | H04N 5/2351 348/222.1 |
| 2015/0254810 A1 | 9/2015 | Heidrich et al. | |
| 2016/0065924 A1* | 3/2016 | Yokoyama | H04N 5/23212 348/241 |
| 2016/0080737 A1 | 3/2016 | Tezaur | |
| 2017/0061587 A1* | 3/2017 | Maeda | G06T 5/003 |
| 2017/0358058 A1* | 12/2017 | Watanabe | H04N 1/409 |
| 2018/0061019 A1* | 3/2018 | Wachi | H04N 5/3572 |
| 2019/0057494 A1* | 2/2019 | Kusumi | G06T 5/006 |

OTHER PUBLICATIONS

Goshtasby; Piecewise Linear Mapping Functions for Image Registration; Pattern Recognition, vol. 19, No. 6, pp. 459-466; revised Feb. 10, 1986.

Goshtasby; "Image registration by local approximation methods"; Image and Vision Computing, vol. 6, 1988, pp. 255-261.

Mosleh et al.; "Camera Intrinsic Blur Kernel Estimation: A Reliable Framework"; 2015 IEEE Conference on Computer Vision and Pattern Recognition, IEEE, Jun. 7, 2015, pp. 4961-4968.

Jul. 2, 2018 French Search Report issued in French Patent Application No. 1758701.

* cited by examiner

METHOD FOR DETERMINING A POINT SPREAD FUNCTION OF AN IMAGING SYSTEM

The invention relates to a method for determining a point spread function of an imaging system, a method for improving an image acquired by an imaging system and a device implementing at least one of said methods.

CONTEXT OF THE INVENTION

A point spread function (PSF), also referred to as an optical pulse response (OPR), is a mathematical function describing a response of an imaging system to a point source. The PSF models how a point is imaged by an imaging system and reflects optical deformations of the imaging system. It is considered that an image of an object issuing from an optical system is the result of a convolution between a signal issuing from the object (i.e. an image issuing from a perfect imaging system without optical deformation) and the PSF modelling the imaging system. When this function is known, it is possible to deconvolution (i.e. to apply an inverse convolution) the image issuing from the imaging system by the PSF in order to obtain an improved image of the object.

There exist various methods for characterising an imaging system. The so-called slanted edge method is for example known, included in ISO 12333:2014, Photography—Electronic still picture imaging—Resolution and spatial frequency responses. This method allows to determine a modulation transfer function (MTF) allowing to evaluate capabilities of an imaging system to faithfully restore a signal. In optics, the MTF is the function that defines a contrast according to a fineness of the details to be restored, i.e. according to spatial frequencies. The MTF corresponds to a modulus of an optical transfer function (OTF) that itself corresponds to a Fourier transform of the PSF.

The method described in the document US 2016/0080737A1 allows to determine a PSF of a lens system. This method uses a target, in the form of a test grid, to determine the PSF. This test grid is placed facing the lens system, at a position corresponding to a focal distance of said system, this focal distance being dependent on the size of the test grid. This method therefore allows only to determine the PSF corresponding to the position of the test grid. The PSF obtained is therefore not valid for any other position of the test grid. An image of an object situated at a position other than the position for which the PSF was calculated could not be correctly corrected by the PSF. This method involves calculating another PSF for this other position and having means for determining the position of the object with respect to the imaging system.

It is desirable to overcome these drawbacks of the prior art. It is in particular desirable to propose a method and device that allow to determine a "generic" PSF, valid for a plurality of positions of an object with respect to the imaging system. Moreover, this method must be simple to implement.

DISCLOSURE OF THE INVENTION

According to a first aspect of the invention, the invention relates to a method for determining a point spread function of an imaging system, comprising: for each position in a plurality of positions of a target in an optical field of said imaging system: acquiring an image of the target, referred to as the real image; obtaining a synthetic image of the target representing a digital model of the target adjusted to a zone of the real image corresponding to the target so that said model coincides with said zone; estimating the point spread function using the real image and the synthetic image; and calculating an optical transfer function by applying a Fourier transform to the point spread function; calculating a average optical transfer function from the optical transfer functions calculated for each position in the plurality of positions; and obtaining a average point spread function by applying an inverse Fourier transform to the average optical transfer function.

Thus a point spread function is obtained that is valid for a plurality of positions of an object situated in the optical field of the imaging system. It is then not necessary to have a point spread function dedicated to each possible position of an object in the optical field of the imaging system, or to determine the position of said object with respect to the imaging system.

According to one embodiment, each position in the plurality of positions is situated in a working zone of the imaging system in which objects having to be imaged by the imaging system must be situated in order to be able to be imaged by the imaging system.

Thus the point spread function is valid for an object situated at any position in the working zone.

According to one embodiment, the estimation of the point spread function comprises: calculating a contour image from the real image, referred to as the real contour image, and a contour image from the synthetic image, referred to as the synthetic contour image, a contour image being obtained from an original image and representing solely contours of objects contained in the original image; determining the point spread function minimising a cost function comprising a first term corresponding to a difference between the real contour image and a convolution product between the point spread function to be estimated and the synthetic contour image.

According to one embodiment, the cost function to be minimised is written as follows:

$$f(h) = \|h * \Delta 0 - \Delta I\|_2^2 + \gamma \|h\|_2^2 + \beta \|h\|_1$$

where $f(h)$ is the cost function to be minimised, h is a matrix representing the point spread function sought, $\|.\|_2^2$ represents a squared norm $L^2$, $\|.\|_1$ represents a norm $L^1$, * is a convolution operator, $\gamma \|h\|_2^2$ is a first regularisation term used for accelerating the convergence of the minimisation, $\beta \|h\|_1$ is a second regularisation term used for obtaining a point spread function derivable over an entire image acquired by the imaging system, and $\gamma$ and $\beta$ are predetermined constants.

According to one embodiment, the target comprises objects comprising edges having high spatial gradients in a plurality of different directions.

According to one embodiment, a geometric transformation for transforming the digital model of the target so that it coincides with said real image zone corresponding to the target is obtained for each position in the plurality of positions.

According to one embodiment, the geometric transformation is calculated using predefined particular points on the target.

According to one embodiment, the method comprises a segmentation of the zone of the real image corresponding to the target, the real image used during the adjustment of the geometric model of the target and during the estimation of the point spread function comprising solely the zone comprising the target, each zone of the real image not corresponding to the target having been eliminated.

According to a second aspect of the invention, the invention relates to a method for improving an image acquired using an imaging system, comprising: obtaining a point spread function of the imaging system by applying the method according to the first aspect; then applying a reverse convolution between the point spread function thus obtained and each image acquired using the imaging system.

According to a third aspect of the invention, the invention relates to a device for determining a point spread function of an imaging system, comprising: means used for each position of a plurality of positions of a target in an optical field of said imaging system, comprising: image acquisition means for acquiring an image of the target, referred to as the real image; obtaining means for obtaining a synthetic image of the target representing a digital model of the target adjusted to a zone of the real image corresponding to the target so that said model coincides with said zone; estimation means for estimating the point spread function using the real image and the synthetic image; and calculation means for calculating an optical transfer function by applying a Fourier transform to the point spread function; and calculation means for calculating a average optical transfer function from the optical transfer functions calculated for each position in the plurality of positions; and obtaining means for obtaining a average point spread function by applying an inverse Fourier transform to the average optical transfer function.

According to a fourth aspect of the invention, the invention relates to a computer program comprising instructions for the implementation, by a device, of the method according to the first or second aspect, when said program is executed by a processor of said device.

According to a fourth aspect of the invention, the invention relates to storage means storing a computer program comprising instructions for the implementation, by a device, of the method according to the first or second aspect, when said program is executed by a processor of said device.

BRIEF DESCRIPTION OF THE DRAWINGS

The features of the invention mentioned above, as well as others, will emerge more clearly from a reading of the following description of an example embodiment, said description being given in relation to the accompanying drawings, among which.

DETAILED DESCRIPTION OF VARIOUS EMBODIMENTS

The following description details more particularly an embodiment of the present invention in a context where the imaging system comprises an image acquisition system such as a digital camera comprising an objective comprising a system of lenses, a focusing system (such as an autofocus system) and an image sensor such as a CCD (charge coupled device) or CMOS (complementary metal oxide semiconductor) image sensor. The method is however suited to other types of imaging system producing images that can be processed digitally, such as analogue cameras, objectives etc.

Figure 1:
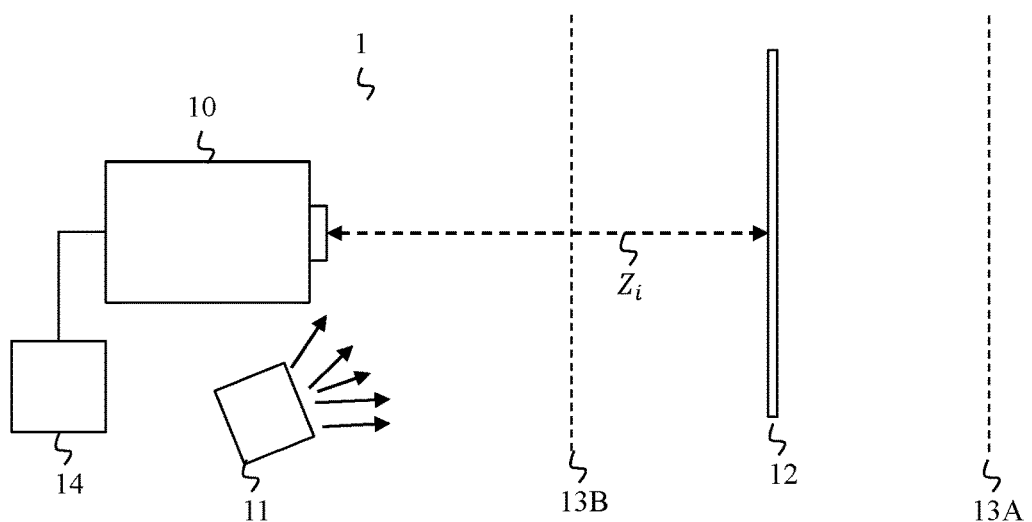
FIG. 1 describes schematically an imaging system for which a PSF is determined using the method according to the invention.

FIG. 1 describes schematically an imaging system 1 for which a PSF is determined using the method according to the invention.

The imaging system 1 in FIG. 1 comprises a digital camera 10. This camera 10 is connected to a processing device 14 implementing the method according to the invention. In front of the camera 10 is an object 12, here a flat object, comprising a target. In one embodiment, the object 12 is placed so that the centre of the target is on an optical axis of the camera 10 at a distance $Z_i$. The distance $Z_i$ lies between a minimum distance 13B and a maximum distance 13A, the zone between the distances 13B and 13A forming a working zone. The working zone is defined as a zone in which objects that have to be imaged by the camera 10 must be situated so as to be able to be imaged by the camera 10. This working zone could be determined for example using a criterion for faithfully restoring certain details of an object. A measurement of a degree of fuzziness in an image could constitute such a criterion.

The imaging system 1 further comprises an illumination system 11 illuminating the object 12.

In one embodiment, the camera 10 comprises an image sensor comprising "2.5 µm" sized pixels and an objective with a focal length of "25 mm" and a fixed aperture of "2.8", and the illumination system produces an infrared light with a wavelength of "860 nm". The working zone is between "55 cm" and "95 cm", an optimum focusing distance being "75 cm".

In one embodiment, the object 12 could be placed so that the centre of the target is in the optical field of the camera 10, i.e. at a place visible to the camera 10, but without being on the optical axis of the camera 10.

Figure 2:
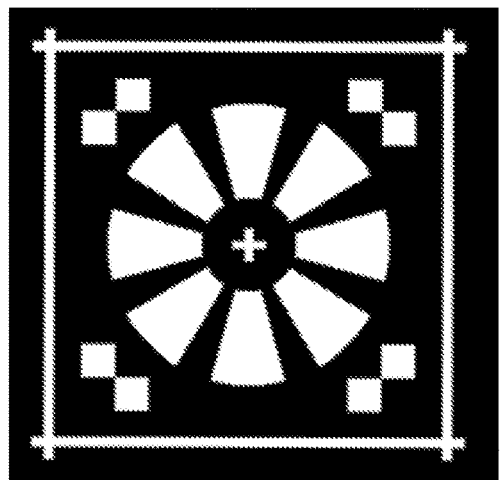
FIG. 2 illustrates schematically an example of a target suited to the method according to the invention.

FIG. 2 illustrates schematically an example of a target 120 suited to the method according to the invention.

In one embodiment, the target 120 comprises objects (geometric shapes) having high spatial gradients in a plurality of different directions. In the example in FIG. 2, the target 120 comprises truncated portions of a disc having sharp edges disposed radially.

In one embodiment, the target 120 comprises particular points allowing to estimate a geometric transformation of the target due to optical deformations of the imaging system 1 (imperfection of the objective, imperfection of the image sensor, etc.). In the target 120 in FIG. 2, the particular points are four pairs of squares connected by one of their corners.

In one embodiment, when the imaging system 1 causes complex optical deformations, it is possible to use a target comprising more than four particular points, the particular points being able to be pairs of squares connected by one of their corners or any other suitable geometric shape such as discs, crosses, triangles, etc.

Figure 3:
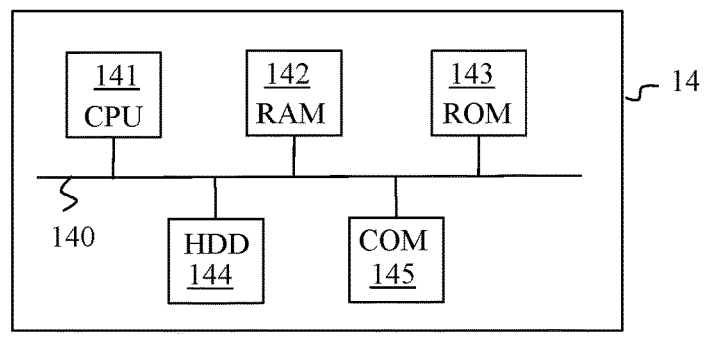
FIG. 3 illustrates schematically an example of hardware architecture of a processing module implementing the method for determining a PSF according to the invention.

FIG. 3 illustrates schematically an example of hardware architecture of the processing module 14.

According to the example of hardware architecture shown in FIG. 3, the processing module 14 then comprises, connected by a communication bus 140: a processor or CPU (central processing unit) 141; a random access memory (RAM) 142; a read only memory (ROM) 143; a storage unit such as a hard disk or a storage medium reader, such as an SD (secure digital) card reader 144; at least one communication interface 145 enabling the processing module 14 to communicate with the camera 10 in order to receive the images acquired by said camera 10 and to control acquisitions of images by the camera 10.

The processor 141 is capable of executing instructions loaded into the RAM 142 from the ROM 143, from an external memory (not shown), from a storage medium (such as an SD card), or from a communication network. When the analysis module 14 is powered up, the processor 141 is capable of reading instructions from the RAM 142 and executing them. These instructions form a computer program causing the implementation, by the processor 141, of the method described in relation to FIG. 4 or FIG. 5.

Figure 4:
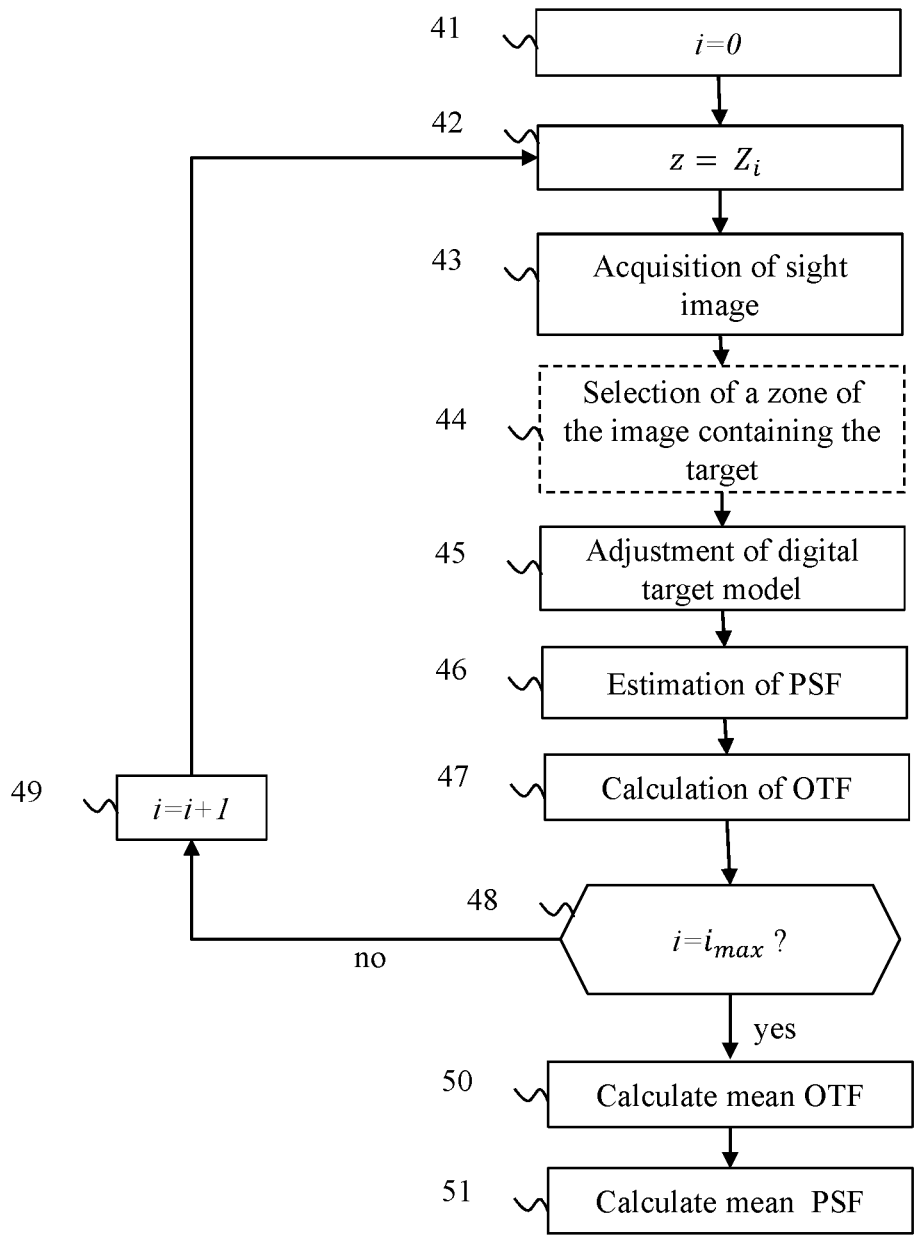
FIG. 4 illustrates schematically an example of a method of determining a PSF according to the invention; and, FIG. 5 illustrates schematically an example of an image improvement method comprising the method for determining a PSF according to the invention.
Figure 5:
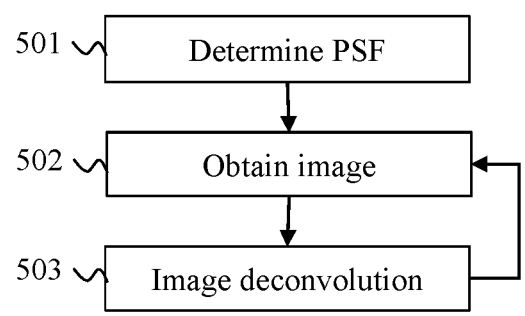

The methods described in relation to FIG. 4 or 5 can be implemented in software form by the execution of a set of instructions by a programmable machine, for example a DSP (digital signal processor), a microcontroller or a GPU (graphics processing unit), or be implemented in hardware form by a machine or a dedicated component, for example an FPGA (field-programmable gate array) or an ASIC (application-specific integrated circuit).

It should be noted that the processing module 14 could just as well have been included in the camera 10.

FIG. 4 illustrates schematically an example of a method for determining a PSF according to the invention.

One objective of the method in FIG. 4 is to determine a PSF of the imaging system 1 that is generic in that this PSF must be suited to a plurality of positions of an object in the working zone rather than to only one particular position.

The method in FIG. 4 begins with a step 41, during which the processing module 14 initialises a variable i to zero. The variable i is a positive integer number used hereinafter to run through a predefined set of distances $Z_i$ included in the working zone. The predefined set comprises a number $i_{max}$ of distances $Z_i$.

In a step 42, the processing module 14 initialises a variable z, representing a distance, at a value of one of the distances $Z_i$ corresponding to the current value of the variable i.

In a step 43, the processing module causes the positioning of the object 12 at the distance z from the imaging system 1, that is to say at a distance z with respect to the outer edge of the objective of the camera 10 closest to the target. In one embodiment, the object 12 is fixed to a sliding device positioned on a horizontal rail parallel to the optical axis of the camera 10. The processing module 14 then controls the sliding device in order to position the object 12 at the required distance from the camera 10.

During step 43, the processing module 14 causes an acquisition of the image, referred to as the real image, of the object 12 by the imaging system 1.

In a step 45, the processing module 14 obtains a synthetic image of the target 120 representing a digital model of the target 120 adjusted to a zone of the real image corresponding to the target so that said digital model coincides with (i.e. is superimposed on) said zone of the real image. The digital model of the target 120 corresponds to an ideal image of the target 120 without optical deformation and without convolution by the PSF of the imaging system 1.

In one embodiment, the object 12 is positioned perpendicular to the optical axis so that the centre of the target is on the optical axis of the camera 10. In this case, the readjustment of the digital model is done iteratively. It is assumed that the processing module 14 stores the digital model of the target 120 in a predefined size corresponding to a maximum size that the target 120 could have in the real image. In a first iteration, the processing module uses the digital model of the target 120 in the predefined size and calculates a difference between the digital model and the target 120 in the real image. In each following iteration, the processing module 14 reduces the size of the target and calculates once again the difference between the digital model and the target 120 in the real image. The iterations stop when the processing module 14 has found a minimum difference. The digital model of the target 120 in the size minimising the difference is then considered to be adjusted to the target 120 of the real image. The processing module 120 then generates the synthetic image from the digital model of the target 120 thus adjusted.

In one embodiment, the processing module 14 determines a geometric transformation allowing to pass from the digital model of the target 120 in the predefined size, to the target 120 as it appears in the real image. This determination is based on a detection of particular points in the real image and a determination of the geometric transformation allowing to project the particular points of the digital model onto the particular points of the real image. The transformation is next applied to the digital model of the target 120 in order to obtain the synthetic image. The determination of the geometric transformation can use for example a method described in the publications Goshtasby, Ardeshir, "Piecewise linear mapping functions for image registration," Pattern Recognition, Vol. 19, 1986, pp. 459-466 and Goshtasby, Ardeshir, "Image registration by local approximation methods," Image and Vision Computing, Vol. 6, 1988, pp. 255-261.

In a particular embodiment, the real image is displayed on a display device of a user and the user outlines a position of each particular point. The position of each particular point thus outlined is next supplied to the processing module 14 so that it implements a procedure of estimating the geometric transformation.

In one embodiment, the processing module 14 obtains, for each distance $Z_i$, a predetermined geometric transformation. Each geometric transformation was determined by placing an object at the distance $Z_i$ from the imaging system 1, acquiring an image of said object, and then determining the geometric transformation allowing to change from the reference image of said object to the image acquired by the imaging system 1.

In a step 46, the processing module 14 estimates the PSF of the imaging system 1 using the real image and the synthetic image.

In one embodiment, the processing module 14 calculates a contour image, referred to as the real contour image, from the real image ΔI and a contour image, referred to as the synthetic contour image, from the synthetic image ΔO. A contour image is obtained from an original image and represents solely contours of objects contained in the original image. It is possible to obtain a contour image by various methods such as for example a Canny filtering or a Sobel filtering. In a particular embodiment, each contour image is obtained by applying a gradient operator to each respective original image (i.e. the real image and the synthetic image). The processing module 14 next determines the PSF minimising a cost function ƒ(h) comprising a first term corresponding to a difference between the real contour image ΔI and a convolution product between the PSF of the imaging system 1 to be estimated and the synthetic contour image ΔO.

The cost function ƒ(h) can be written as follows:

$$f(h) = \|h * \Delta O - \Delta I\|_2^2 + \gamma \|h\|_2^2 + \beta \|h\|_1$$

where h is a matrix representing the PSF sought, $\|.\|_2^2$ represents a squared norm $L^2$, $\|.\|_1$ represents a norm $L^1$, and * is a convolution operator. The term $\gamma\|h\|_2^2$ is a first regularisation term that the processing module 14 optionally uses to accelerate the convergence of the minimisation. The term $\beta\|h\|_1$ is a second regularisation term that the processing module 14 optionally uses to obtain a PSF that can be derived over the entire image, that is to say having a smoothed form. $\gamma$ and $\beta$ are predetermined constants. In one embodiment, the constant $\gamma$ is determined by carrying out a plurality of minimisations on an image base by varying the constant $\gamma$ at each image in the base. At the end of each minimisation, information representing a level of sharpness of the image obtained by deconvolution by the PSF is calculated and the constant $\gamma$ allowing to obtain the best level of sharpness is kept. The constant $\beta$ is obtained in a similar manner.

There exist various known minimisation methods applicable to the minimisation of the cost function $f(h)$.

In one embodiment, the cost function $f(h)$ is minimised by a conjugate gradient method or by the method of Lagrange multipliers. The PSF minimising the cost function $f(h)$ is denoted $h_i$.

In a step 47, the processing module 14 calculates the OTF of the PSF $h_i$, denoted $H_i$, by applying a Fourier transform to the PSF $h_i$.

In a step 48, the processing module 14 determines whether the variable i is equal to the number of distances in the predefined set of distances $Z_i$. If such is not the case, the variable i is incremented by one unit by the processing module 14 during a step 49 and the processing module 14 returns to step 42.

If the variable i has reached the number of distances in the predefined set of distances $Z_i$, the processing module 14 passes to a step 50, during which the processing module 14 calculates a average OTF, denoted $H_{mean}$, from the OTFs $H_i$ calculated for each distance $Z_i$. In one embodiment:

$$H_{mean} = \frac{\sum_{i=0}^{i<i_{max}} H_i}{i_{max}}$$

The OTFs $H_i$ being represented in a form of matrices, the average is an average matrix, that is to say each coefficient in a matrix $H_i$ is averaged with the coefficient situated at the same position in the other matrices $H_i$.

In a step 51, the processing module obtains an average PSF $h_{av}$ by applying a reverse Fourier transform to the average OTF $H_{av}$: the average PSF $h_{av}$, is then considered to be the PSF of the imaging system 1. This PSF is valid whatever the distance of an object with respect to the imaging system 1 included in the working zone. This PSF can therefore be validly used to improve an image acquired by the imaging system 1 of an object situated at any position in the working zone.

It should be noted that passing through a average OTF for calculating the average PSF, rather than a direct calculation of the average PSF by taking an average of the PSFs $h_i$, affords better preservation of the information contained in each PSF $h_i$ for calculating the PSF $h_{av}$.

In one embodiment, the method of FIG. 4 comprises a step 44 situated between step 43 and step 45 during which the processing module 14 detects, in the real image, a zone comprising the target 120. This step amounts to segmenting the real image so as to extract therefrom the zone comprising the target 120. In one embodiment, the real image is displayed on a display device such as a computer of a user and the user outlines the target 120 in the real image by means of a pointing device such as a mouse. In another embodiment, an active-contour-based automatic segmentation method is used for segmenting the target 120 in the real image. The real image used during steps 45 and 46 is then an image comprising solely the zone comprising the target 120, all the zones of the real image not corresponding to the target having been eliminated. Thus the adjustment of the digital model of the target 120 and the estimation of the PSF of the imaging system 1 are not interfered with by zones of the real image not corresponding to the target 120.

FIG. 5 illustrates schematically an example of an image improvement method comprising the method according to the invention.

The method in FIG. 5 is implemented by the processing module 14 at each acquisition of an image of an object by the imaging system 1.

In a step 501, which could be termed a configuration step, prior to the acquisition of an image of an object by the imaging system 1, the processing module 14 executes the method described in relation to FIG. 4. During this execution, the processing module 14 obtains the PSF of the imaging system 1.

In a step 502, the processing module 14 obtains an image of an object acquired by the imaging system 1.

In a step 503, the processing module 14 applies an inverse convolution (i.e. a deconvolution) to the image of the object received by the PSF obtained during step 501 in order to obtain an improved image of the object. In one embodiment, the processing module 14 applies a Wiener deconvolution to the image of the object.

Following step 503, the processing module awaits a new image of an object acquired by the imaging system 1 and returns to step 502 as soon as it obtains a new image.

The invention claimed is:

1. A method for determining a point spread function of an imaging system, the point spread function describing a response of the imaging system to a point source, the method comprising:
   for each position in a plurality of positions of a target in an optical field of said imaging system:
      acquiring an image of the target, referred to as the real image;
      obtaining a synthetic image of the target representing a digital model of the target adjusted to a zone of the real image corresponding to the target so that said model coincides with said zone;
      estimating the point spread function using the real image and the synthetic image; and
      calculating an optical transfer function by applying a Fourier transform to the point spread function;
   calculating an average optical transfer function from the optical transfer functions calculated for each position in the plurality of positions; and
   obtaining an average point spread function by applying an inverse Fourier transform to the average optical transfer function.

2. The method according to claim 1, wherein each position in the plurality of positions is situated in a working zone of the imaging system in which objects having to be imaged by the imaging system must be situated in order to be able to be imaged by the imaging system.

3. The method according to claim 1, wherein the estimation of the point spread function comprises:
   calculating a contour image from the real image, referred to as the real contour image, and a contour image from the synthetic image, referred to as the synthetic contour image, a contour image being obtained from an original image and representing solely contours of objects contained in the original image;

determining the point spread function minimising a cost function comprising a first term corresponding to a difference between the real contour image and a convolution product between the point spread function to be estimated and the synthetic contour image.

4. The method according to claim 1, wherein the target comprises objects comprising edges having high spatial gradients in a plurality of different directions.

5. The method according to claim 1, wherein a geometric transformation for transforming the digital model of the target so that it coincides with said real image zone corresponding to the target is obtained for each position in the plurality of positions.

6. The method according to claim 1, wherein the method further comprises a segmentation of the zone of the real image corresponding to the target, the real image used during the adjustment of the geometric model of the target and during the estimation of the point spread function comprising solely the zone comprising the target, each zone of the real image not corresponding to the target having been eliminated.

7. The method for improving an image acquired using an imaging system, wherein the method further comprises:
obtaining a point spread function of the imaging system by applying the method according to claim 1; then
applying a reverse convolution between the point spread function thus obtained and each image acquired using the imaging system.

8. A non-transitory information storage medium, that stores a computer program comprising program code instructions which can be loaded in a programmable device to cause said programmable device to implement the method according to claim 1, when the program code instructions are run by the programmable device.

9. The method according to claim 3, wherein the cost function to be minimised is written as follows:

$$f(h)=\|h*\Delta 0-\Delta I\|_2^2+\gamma\|h\|_2^2+\beta\|h\|_1$$

where $f(h)$ is the cost function to be minimised, h is a matrix representing the point spread function sought, $\|.\|_2^2$ represents a squared norm $L^2$, $\|.\|_1$ represents a norm $L^1$, * is a convolution operator, $\gamma\|h\|_2^2$ is a first regularisation term used for accelerating the convergence of the minimisation, $\beta\|h\|_1$ is a second regularisation term used for obtaining a point spread function derivable over an entire image acquired by the imaging system, and $\gamma$ and $\beta$ are predetermined constants.

10. The method according to claim 5, wherein the geometric transformation is calculated using predefined particular points on the target.

11. A device for determining a point spread function of an imaging system, the point spread function describing a response of the imaging system to a point source, wherein the device comprises:
electronic circuitry adapted for:
for each position of a plurality of positions of a target in an optical field of said imaging system acquiring an image of the target, referred to as the real image;
obtaining a synthetic image of the target representing a digital model of the target adjusted to a zone of the real image corresponding to the target so that said model coincides with said zone;
estimating the point spread function using the real image and the synthetic image; and
calculating an optical transfer function by applying a Fourier transform to the point spread function;
calculating an average optical transfer function from the optical transfer functions calculated for each position in the plurality of positions; and
adapted for obtaining an average point spread function by applying an inverse Fourier transform to the average optical transfer function.

* * * * *